(12) United States Patent
Takano (10) Patent No.: US 7,274,525 B2
(45) Date of Patent: Sep. 25, 2007

(54) INFORMATION PROCESSING SYSTEM (75) Inventor: Naoto Takano, Chiba (JP)

(73) Assignee: Scarabs Corporation Co., Ltd, Chiba (JP)

( * ) Notice: Subject to any disclaimer, the term of this patent is extended or adjusted under 35 U.S.C. 154(b) by 790 days.

(21) Appl. No.: 10/169,006

(22) PCT Filed: Oct. 18, 2001

(86) PCT No.: PCT/JP01/09139

§ 371 (c)(1),
(2), (4) Date: Jun. 20, 2002

(87) PCT Pub. No.: WO02/33704

PCT Pub. Date: Apr. 25, 2002

(65) Prior Publication Data

US 2003/0005218 A1 Jan. 2, 2003

(30) Foreign Application Priority Data

| Oct. 19, 2000 | (JP) | ............................. 2000-319148 |
| Oct. 31, 2000 | (JP) | ............................. 2000-332192 |
| Feb. 16, 2001 | (JP) | ............................. 2001-39714 |
| Oct. 5, 2001 | (JP) | ............................. 2001-309354 |

(51) Int. Cl.
*G11B 19/02* (2006.01)
*G11B 5/596* (2006.01)
*G06F 12/00* (2006.01)

(52) U.S. Cl. ..................... 360/69; 360/78.12; 711/112; 700/2; 726/23; 726/26

(58) Field of Classification Search .................... None
See application file for complete search history.

(56) References Cited

U.S. PATENT DOCUMENTS

| 5,343,347 | A | * | 8/1994 | Gilovich .................. 360/246.7 |
| 5,355,486 | A | * | 10/1994 | Cornaby ..................... 718/102 |
| 5,610,808 | A | * | 3/1997 | Squires et al. ................. 700/2 |
| 6,483,659 | B1 | * | 11/2002 | Kobayashi et al. ...... 360/78.04 |

FOREIGN PATENT DOCUMENTS

| JP | 59-033608 | 2/1984 |
| JP | 59-81738  | 1/1986 |
| JP | 05-257613 | 10/1993 |

* cited by examiner

*Primary Examiner*—Andrew L. Sniezek
(74) *Attorney, Agent, or Firm*—Michael A. Glenn; Glenn Patent Group (57) ABSTRACT

There is disclosed an information processing system which makes it impossible for a malicious third person to intrude thereinto from the outside through an external network for altering information recorded on a storage device of the server system or surreptitiously reading mails in the mailbox. This information processing system comprises a writable storage device (21), first and second input/output channels (18 and 19) connected to the storage device (21), a first computer (22) connected to the first input/output channel (18) and a second computer (23) connected to the second input/output channel (19). The first computer (22) is connected to an external network (24) such as the Internet and an intranet. The first input/output channel (18) is arranged as a channel exclusively for performing reading from the storage device (21) or a channel exclusively for performing writing into an empty area of the storage device (21) in dependence on the application of this information processing system. The first input/output channel (18) and the second input/output channel (19) are driven independently of each other. The information processing system in which the first input/output channel (18) is a channel exclusively for reading from the storage device (21) is suitable for the maintenance and/or management of a home page. The information processing system in which the first input/output channel (18) is a channel exclusively for performing writing into the storage device (21) is suitable for the maintenance and/or management of e-mails.

23 Claims, 6 Drawing Sheets

INFORMATION PROCESSING SYSTEM

TECHNICAL FIELD

The present invention relates to an information processing system which is prevented from destruction by a virus program or a hacker.

The invention further relates to an information recording apparatus which can be used in such an information processing system.

BACKGROUND ART

In Japanese Patent Application Laid-Open No. H05-257613, there is disclosed a hard-disc drive apparatus (hereinafter referred to as a "conventional apparatus") which comprises a plurality of read/write heads arranged such that the hard disc is divided equally in order to shorten the read/write time of the hard disc and also to shorten the time required for reading/writing a plurality of tasks and/or the random access time to each track.

More specifically, this conventional apparatus comprises a control mechanism, a main buffer for reading/writing, two read/write heads A and B and sub-buffers each provided for a respective one of the heads. In the following, description will be made of an exemplary sequence for changing the operations of both heads in the conventional apparatus for the case where the operating condition in which the head A is writing into the disc with the head B reading from the disc is to be change, in response to a changeover request from the outside, to another condition in which the head A is in the read mode with the head B being in the write mode.

1. The control mechanism transmits to the head A a command for stopping writing.

2. Upon receiving the write stop command, the head A returns an acknowledgement of receipt of the stop command to the control mechanism.

3. The control mechanism waits for the acknowledgement of receipt from the head A. If the acknowledgement of receipt of the write stop command is not received, the control mechanism retransmits the write stop command to the head A. If the acknowledgement of receipt of the write stop command is not received from the head A in spite of retransmitting the write stop command a predetermined number of times, the control mechanism carries out an error processing.

4. The control mechanism calculates the number of data transmitted to the write sub-buffer of the head A so far and, when the number has reached the end of one record, stops the transmission of data from the main buffer.

5. The head A continues the writing operation until the data it has written reaches the end of one record.

6. Since it is prohibited to change the write mode to the read mode during the writing operation, if a head mode change command is transmitted from the control mechanism, that command will be rejected.

7. When the data have been written up to the end, the head A stops the writing operation and transmits to the control mechanism those numbers of the track and the sector, where the head A wrote the data last, together with the start location of the data remained unprocessed in the write main buffer.

8. The control mechanism echoes the received data back to the head A.

9. The head A receives the acknowledgment of receipt of data from the control mechanism, cancels the condition of rejecting the change of mode if the (echoed) data is correct, and informs the control mechanism of the cancellation.

10. If the echoed data contains an error, the head A again transmits to the control mechanism a command for retransmitting echo data. If the data thus retransmitted has not been corrected, this writing operation is treated as an error.

11. When a signal indicating that the condition of rejecting the change of mode has been cancelled is received from the head A, the control mechanism transmits, to the head A, a mode change command from the write mode to the read mode.

12. The head A returns to the control mechanism an acknowledgment of receipt of the mode change command.

13. The control mechanism checks the returned command and, if it contains an error, retransmits the mode change command to the head A. If the command again returned still contains an error, the mode change command is processed as an error.

14. The control mechanism transmits to the head B a command for stopping reading.

15. Upon receiving the read stop command, the head B returns an acknowledgement of receipt of the stop command to the control mechanism.

16. The control mechanism waits for the acknowledgement of receipt of the read stop command from the head B. If the acknowledgement of receipt of the read stop command is not received, the control mechanism retransmits the read stop command to the head B. If the acknowledgement of receipt of the read stop command is not received from the head B in spite of retransmitting the read stop command a predetermined number of times, the control mechanism carries out an error processing.

17. The head B performs the read operation until the data it has read reaches to the end of one record while calculating the number of data read so far and checking the amount of data.

18. After the read operation ends, transmission of new data from the read sub-buffer associated with the head B to the read main buffer is stopped.

19. Since it is prohibited to change the read mode to the write mode during the read operation, if a head mode change command is transmitted from the control mechanism, that command will be rejected.

20. When the data have been read up to the end of one record, the head B terminates the read operation and transmits to the control mechanism those numbers of the track and the sector, where the head B read the data last.

21. The control mechanism echoes the received data back to the head B.

22. The head B receives the acknowledgment of receipt of data from the control mechanism, cancels the condition of rejecting the change of mode if the (echoed) data is correct, and informs the control mechanism of the cancellation.

23. If the echoed data contains an error, the head B again transmits to the control mechanism a command for retransmitting echo data. If the data thus retransmitted has not been corrected, this read operation is processed as an error.

24. When a signal indicating that the condition of rejecting the change of mode has been cancelled is received from the head B, the control mechanism transmits to the head B a mode change command from the read mode to the write mode.

25. The head B returns to the control mechanism an acknowledgment of receipt of the mode change command.

26. The control mechanism checks the returned command and, if it contains an error, retransmits the mode change command to the head B. If the command again returned still contains an error, the mode change command is processed as an error.

27. The control mechanism confirms the fact that the operation modes of the head A and B have been changed over.

28. The control mechanism informs the head A of those numbers of the track and sector where reading should be performed.

29. The head A copies the data thus read to the read main buffer.

30. The reading operation is continued.

31. The control mechanism informs the head B of those numbers of the track and sector where writing should be performed.

32. The head B copies the specified data from the write main buffer to the write sub-buffer associated with the head B.

33. The writing operation is continued.

In the conventional hard-disc drive apparatus in order to carry out reading and writing with the two (i.e., the read and write) heads, in addition to the above-mentioned sequential processing of the lower level, a further sequential processing of the higher level must always be carried out, in which further sequential processing the track and sector at which writing is currently performed and the track and sector at which reading is currently performed are recognized, the track and sector at which reading must be performed next and the track and sector at which writing must be performed next are searched from a FAT (File Allocation Table), and these four values are then compared to determine what type of operation each of the head A and B must perform. One example of the higher level sequential processing is the shortest-time processing.

Figure 3:
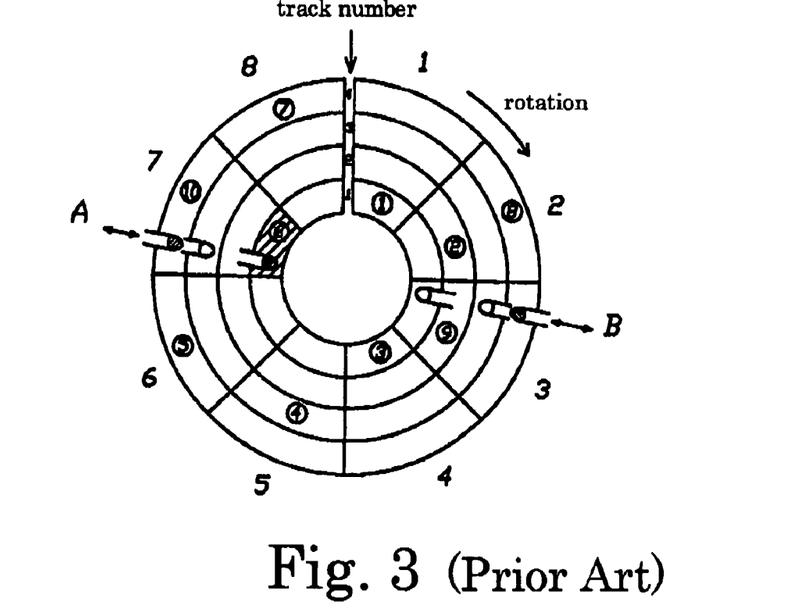
FIG. 3 is an illustration explaining the read/write operation by the conventional hard-disc drive apparatus.

The shortest-time processing will now be described with reference to FIG. 3. It is here assumed that the rotary magnetic disc is rotating clockwise. FIG. 3 shows the situation in which the head A is writing into the sixth record (first track, seventh sector) as indicated by hatching whereas the head B has finished reading of the third record (first track, fourth sector).

For the processing to be performed next, there will be the following possibilities a and b:

a. The head A is moved to the third track to read the fourth record at the fifth sector, and the head B is moved to the fourth track to perform writing into the seventh record at the eighth sector.

b. The head A is moved to the fourth track to perform writing into the seventh record at the eighth sector, and the head B is moved to the third track to read the fourth record at the fifth sector.

In order to achieve the shortest-time processing, a calculation must be carried out in advance to determine which of the above operations a and b will be finished within a shorter time period.

In addition, if the user requests a special feature (e.g., a fast slip replay) to be performed, further processing which cannot be dealt with by such a simple comparison-based operation as that for the above-mentioned shortest-time processing will be needed. In such processing, it will be necessary to constantly examine whether or not the fast replay has overtook the recording, and, if it has, a more complicate control must be performed to deal with the plurality of heads which have the functions of switching between reading and writing.

In sum, the conventional hard-disc drive apparatus has to perform the read and write operations in correspondence with each of a huge number of combinations which are different in accordance with the locations of records to be accessed for reading/writing, the positions of the head A and B, the modes of operation of the heads A and B, and the special features. To implement this, the convention hard-disc drive apparatus must be provided with such a complicated and expensive read/write change control mechanism for which a control program composed of a huge number of program steps as well as a dedicated IC of a high processing speed must be developed.

On the other hand, in an information processing system provided with an information recording apparatus which reads files on an external storage medium such as a CD-ROM and MO, when a file of the external storage medium in which a virus program lies concealed is activated with the information recording apparatus of the information processing system being in operation, the virus program is executed, with the result that the information processing system may be destroyed. Conventionally, in order to avoid such destruction, viruses are removed in advance by means of vaccine software designed to remove virus programs. However, since new viruses constantly appear there exists no perfect vaccine software which can remove every virus program. In addition, any vaccine software currently available needs to be updated to its newest version always.

In recent years, there have been and are arising serious problems that home pages of governmental offices and companies are illegally altered by hackers. Conventionally, intrusions of hackers into a home page have been prevented by the provision of a firewall. However, hackers somehow create new techniques which are not rejected by such firewall, intrude into the server system for the home page and alter the contents of the home page which are stored in its hard-disc drive apparatus. Therefore, even when a firewall is provided and it is reinforced, there is a certain limit in preventing illegal intrusions into the home page by such firewall. In other words, in the conventional system, once the firewall is breached the system administrator has no means to counteract the hacker any longer. This is because the storage device in the conventional server system has only one read/write head used, so that the hacker can alter the home page if she/he has managed to reach the head.

DISCLOSURE OF THE INVENTION

It is an object of the present invention to provide an information recording apparatus which can obviate the need for such a control program composed of a huge number of program steps and a dedicated IC of a high processing speed which have been needed in the conventional hard-disc drive apparatus.

It is another object of the present invention to provide an information processing system which is prevented from destruction by a virus program read from storage medium, such as a CD-ROM, which contains such virus program.

It is a further object of the present invention to provide an information processing system in which it is made impossible for a malicious third person to intrude thereinto from the outside through an external network to alter information stored in the storage device of the server system, or to surreptitiously read mails in the mailbox or alter the log files.

An information recording apparatus according to the present invention is characterized by comprising a writable disc, a hard-disc drive section for driving the disc, a first head for reading data from and writing data into the disc, a first head drive section for driving the first head, a first head control circuit for controlling the first head, a first input/output channel connected to the first head control circuit, a second head for reading data from the disc, a second head drive section for driving the second head, a second head control circuit for controlling the second head and a second input/output channel connected to the second head control circuit, wherein the first head and the second head are driven independently of each other. In the recording apparatus according to the invention, the second head is arranged to be for the exclusive use for reading, the complicate and expensive mechanism for controlling read/write switching of the conventional hard-disc drive apparatus can be dispensed with.

In an information processing system which comprises the above-described information recording apparatus, a first computer connected to the first input/output channel and provided with an external storage device, and a second computer connected to the second input/output channel, and in which the first head is arranged so as to be able to perform both reading and writing but the second head is arranged so as to be able to perform reading only, when the second computer executes a file which may have been infected with a virus, an effect will appear on the operation thereof if the file has indeed been infected but the virus cannot damage the files on the writable disc. When the effect of the infection with the virus appears, virus checking should be done. When a virus is found in this checking, the first computer removes the relevant files which have been written in the disc and the external storage device. Consequently, an information processing system which can be prevented from destruction by a virus program read from storage medium such as a CD-ROM is obtained.

An information processing system according to one aspect of the present invention comprises a writable disc, a disc drive section for driving the disc, a first head for reading data from and writing data into the disc, a first head drive section for driving the first head, a first head control circuit for controlling the first head, a first input/output channel connected to the first head control circuit, a second head for reading data from and writing data into the disc, a second head drive section for driving the second head, a second head control circuit for controlling the second head, a second input/output channel connected to the second head control circuit, a first computer connected to the first input/output channel and a second computer connected to the second input/output channel, wherein the first head and the second head are driven independently of each other and wherein the first computer is connected to an external network. In this information processing system, the first head and the second head are driven independently of each other, that is to say, a malicious third person cannot reach the second head even when she/he can penetrate this system from the external network, so that the information (the home page, mails and so on) maintained and managed by the second computer will never be destroyed or altered by the malicious third person by means of the second head.

With the information processing system wherein the first head is exclusively for reading, any malicious third person penetrating from the external network cannot perform writing, so that the security of this information processing system is more robust.

With the information processing system wherein the first head is a head provided exclusively for writing into an empty area of the disc, users entering this system from the external network can only perform writing, so that this system is suitable for use as an e-mail system or the like. More specifically, the users only write their mails and cannot read nor alter the mails already written in and/or the access logs.

An information processing system according to another aspect of the invention comprises a writable storage device, a first input/output channel coupled to the storage device for exclusively performing reading from the storage device, a second input/output channel coupled to the storage device for performing reading/writing with respect to the storage device, a first computer connected to the first input/output channel and a second computer connected to the second input/output channel, wherein the first input/output channel and the second input/output channel are driven independently of each other and wherein the first computer is connected to an external network.

In this information processing system, the external network is not coupled to the second input/output channel while the first input/output channel and the second input/output channel are driven independently of each other, so that a malicious third person cannot reach the second input/output channel even when she/he penetrates this system from the external network. Thus, it is impossible for malicious third persons to destroy and/or alter the information (the home page or the like) as maintained and managed by the second computer by means of the second channel.

Since the first input/output channel is a read-only channel with respect to the storage device, malicious intruders cannot perform writing into the storage device even by means of the first computer. As a result, the security of this information processing system becomes quite robust.

An information processing system suitable for use as a write-only e-mail system comprises a writable storage device, a first input/output channel coupled to the storage device exclusively for performing writing into empty areas of the storage device, a second input/output channel coupled to the storage device for performing reading/writing with respect to the storage device, a first computer connected to the first input/output channel and a second computer connected to the second input/output channel, wherein the first input/output channel and the second input/output channel are driven independently of each other and wherein the first computer is connected to an external network.

In this information processing system, the external network is not coupled to the second input/output channel, and the first input/output channel and the second input/output channel are driven independently of each other, so that a malicious third person cannot reach the second input/output channel even when she/he penetrates this system from the external network. Thus, it is impossible for malicious third persons to destroy and/or alter e-mails and/or access logs which are maintained and managed by the second computer.

Since the first input/output channel is a write-only channel for exclusively writing into empty areas of the storage device, malicious intruders cannot perform reading from the storage device nor overwriting the records existing in the storage device. As a result, the security of this information processing system becomes quite robust.

In an information processing system which is reliable and relatively cheap, the writable storage device comprises a writable disc, a head for reading data from and writing data into the disc, a head drive section for driving the head, a head control circuit for controlling the head, and a processing circuit connected to the first input/output channel and the second input/output channel for processing read/write requests from the first input/output channel and the second input/output channel, the processing circuit supplying results of the processing to and receiving information from the head control circuit. In this information processing system, for example, a hard disc, a DVD-RAM or a magneto-optical disc can be used as the writable disc. These discs are currently the most popular and widely used storage media, so that the information processing system utilizing such writable disc is relatively cheap and reliable.

An information processing system in which the writable storage device is constituted by an electronic circuit is excellent in the life time and reliability by virtue of the absence of movable parts such as a disc drive device.

An information processing system in which the security has been further enhanced as compared to the above-described information processing systems comprises, in addition to the structure of the above-described information processing system, a writable second storage device, a write-only third input/output channel coupled to the second storage device for carrying out only writing into an empty area of the second storage device, and a fourth input/output channel coupled to the second storage device for performing reading/writing with respect to the second storage device which are all connected between the first computer and the second computer.

The information for the home page of the system administrator is written by the second computer through the second input/output channel into the first storage device, and maintained and managed therein. When an external user attempts to read the home page thus stored in the first storage device, the first computer reads the home page information from the first storage device using the first input/output channel and supplies it to the user through the external network. When an external user wishes to write a mail through the external network into this system, the first computer writes the mail of the user through the third input/output channel into the second storage device.

Only connected to the first computer which is connected to the external network are the first input/output channel which can only read the contents of the first storage device and the third input/output channel which can only write into the second storage device at an empty area where no mail nor access log has been written. In other words, the first computer connected to the external network is not connected to the second computer which maintains and manages the home page and mails. Therefore, even if a malicious third person intrudes through the external network into this system and succeeds in fully controlling the first computer, she/he will not be able to reach the second computer, so that this malicious third person cannot stealthily read or alter the arrived mails, alter the access logs or alter the home page by means of the second computer.

Since the first input/output channel is a read-only channel for the first storage device, a malicious intruder cannot perform writing into the first storage device even by means of the first computer.

Furthermore, since the third input/output channel is a write-only channel for writing only into an empty area of the second storage device, a malicious intruder cannot read from the second storage device nor overwrite the existing records in this device. As a result, the security of this system is quite robust.

In an information processing system in which the writable storage device is constituted by an electronic circuit, it is possible to construct the writable storage device with a semiconductor integrated circuit or the like, so that a system which is compact and reliable by virtue of the absence of movable parts such as a rotary-type record disc can be realized.

An information processing system according to a further aspect of the invention comprises a disc having a plurality of record areas, at least one head for performing reading/writing with respect to the disc, two or more input/output channels connected to the head, a first computer connected to one of the input/output channels (hereinafter referred to as "first input/output channel"), and a second computer connected to another one of the input/output channels (hereinafter referred to as "second input/output channel") and provided with an external storage device, wherein the first record area of the record areas is arranged as an area which can only be read through the second input/output channel, while the second record area other than the first record area is arranged as an area to which only an additional writing can be made through the second input/output channel, the first and second record areas both being arranged such that reading and writing can be made with respect thereto through the first input/output channel, the first computer reading a file, which has been written by the second computer into the second record area, and writing same into the first record area, the second computer reading a file from the external storage device and adding same to the second record area.

In this information processing system, the second computer can only read the first record area (i.e., cannot write thereinto). Therefore, even when this second computer executes a file containing a virus, the contents of the first record area will not be altered and thus this information processing system will not be destroyed. On the other hand, the second computer cannot read the second record area, so that it will never happen that this second computer reads any virus program written into the second record area. Thus, even when a program containing a virus is executed, the second computer will not alter any file in the first and second record areas.

An information processing system according to a still further aspect of the invention which is suitable for use as a server for a home page and mails comprises a disc having a plurality of record areas, at least one head for performing reading/writing with respect to the disc, two or more input/output channels connected to the head, a first computer connected to one of the input/output channels (hereinafter referred to as "first input/output channel"), and an second computer connected to another one of the input/output channels (hereinafter referred to as "second input/output channel") and connected to a network, wherein the first record area of the record areas is arranged as an area which can only be read through the second input/output channel, while the second record area other than the first record area is arranged as an area to which only an additional writing can be made through the second input/output channel, the first and second areas both being arranged such that reading and writing can be made with respect thereto through the first input/output channel, the first computer reading a file, which has been written by the second computer into the second record area, and writing same into the first record area, the second computer receiving a file from the network and adding same to the second record area.

In this information processing system, even if a hacker on the network attempts to alter the data of the home page or the like recorded on the disc, the second computer can only read the first record area and cannot read the second record area. In addition, the second computer cannot write into the first record area, so that it is impossible for the hacker to alter and/or delete the programs/data of the home page stored in the disc. Rewriting of the programs/data of the home page is performed by the head connected to the first computer.

Mails which are written by users on the network into the second record area are copied by the first computer to the first record area. Since the second computer can read files in the first record area, users on the network can read those mails recorded in the first record area which are addressed to them.

In an information processing system of the above-type which comprises only one head together with a head control device, the structure of the hard disc may be simple.

BEST MODE FOR CARRYING OUT THE INVENTION

Figure 1:
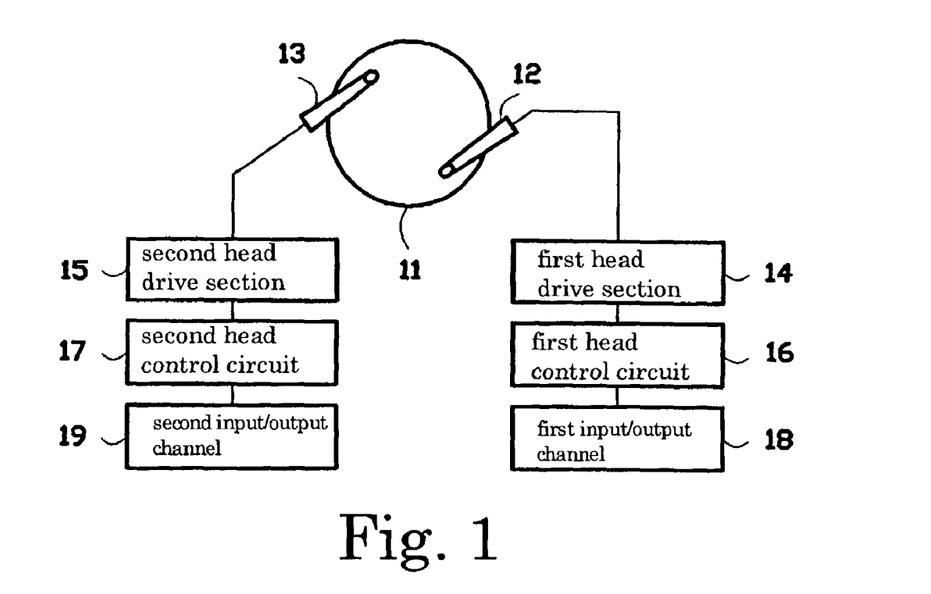
FIG. 1 shows an information recording apparatus according to the invention.

An information recording apparatus according to the present invention comprises, as shown in FIG. 1, a writable disc 11 such as a hard disc and a DVD-RAM, a disc drive section for driving the disc 11, a first head 12 for reading data from and writing data into the disc 11 and a second head 13 for reading data from the writable disc 11. The first head 12 is driven by a first head drive section 14, while the second head 13 is driven by a second head drive section 15. The first head 12 is controlled by a first head control circuit 16 which is connected to a first input/output channel 18. The second head 13 is controlled by a second head control circuit 17 which is connected to a second input/output channel 19 (having no write function). Thus, the first head 12 is for performing reading and writing, but the second head 13 is exclusively for reading. Furthermore, each one of the first head 12 and second head 13 independently carries out the control, drive and input/output of data with respect to the outside irrespective of the position and operation mode of the other head. The information recording apparatus according to the invention applies to each head the numbers of the sector and track where reading/writing should be done and comprises for each head a buffer for the data to be read/written.

The operation of the information recording apparatus according to the invention will now be described. It is assumed here that, for the recording of a film program of TV broadcast, the first head 12 has been recording the program on the writable disc 11 from one hour ago. When the user wishes to view the film program under recording from the beginning, the user gives the information recording apparatus a corresponding command. In response to this command, the second head 13 locates the track and sector numbers corresponding to the beginning of this film program from its buffer, moves to the position on the disc corresponding to these numbers and starts, from that position, reading the file to be read (i.e., the film program which the first head has written). This reading operation is different from the conventional way of reading files in that the file which has been written by the first head is incomplete. This problem can be dealt with during the processing of the reproduced data by examining the data as read by the second head itself.

When the second head carried out the read operation at the same speed as the write operation of the first head, the reading position by the second head will not catch up with the writing position by the first head, so that the recording and the replay can be performed simultaneously but independently.

When the reading position by the second head has overtaken the trailing end position of the file which the first head is writing as a result of the fast replay, it will be possible to detect this condition from the data read by the second head itself. What can be detected from such data may, for example, be the fact that the pointer to the next record has no value or that an End of file has been reached, in response to which the second head can stop reading or change itself to the read operation at the same speed. In the above situation, even if the second head continues the read operation, only meaningless reading will follow. The user can then manually stop the operation to remove such situation. The second head is a head which is exclusively for reading and operable completely independent of the first head, so that even when the reading portion by the second head passes the writing portion by the first head, this fact will have no effect on the write operation of the first head. That is to say, since the first and second heads can thus operate independently of each other, the information recording apparatus according to the present invention does not need a device for changing the operations of the first and second heads.

Figure 2:
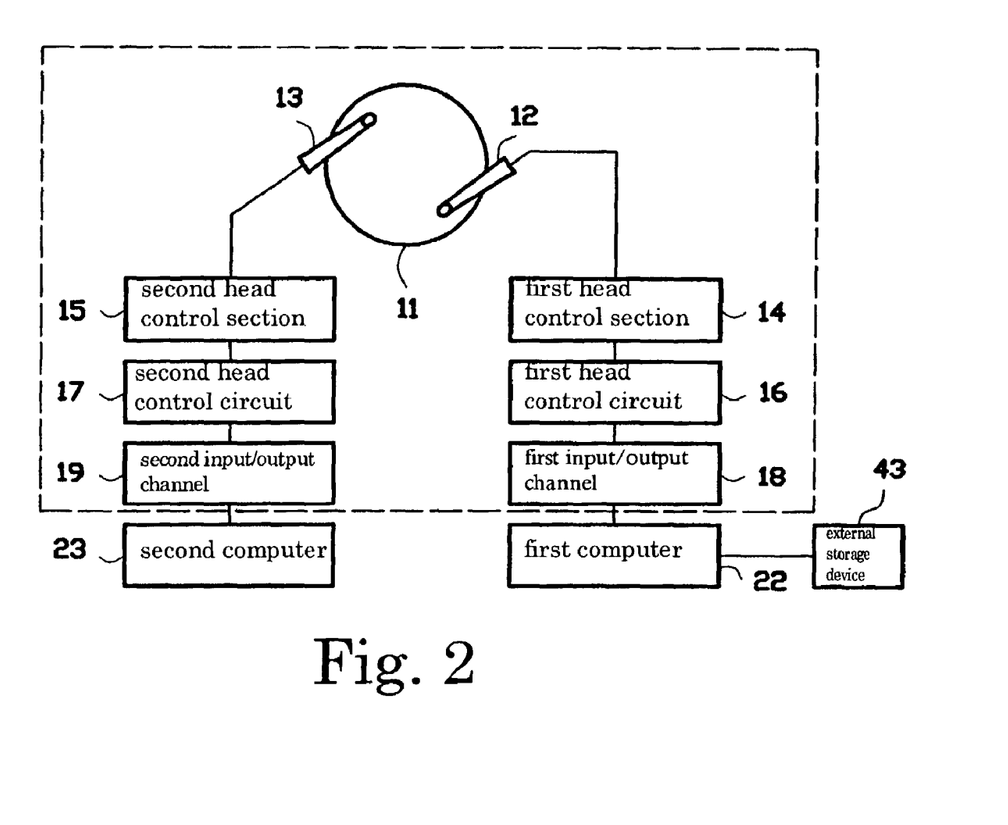
FIG. 2 shows an information processing system according to the invention in which the information recording apparatus of FIG. 1 is employed.

An information processing system according to an embodiment of the invention to which the above information recording apparatus has been applied will now be described with reference to FIG. 2. The information processing system according to this embodiment is constituted by the information recording apparatus shown in FIG. 1 (the portion encircled by dotted lines in FIG. 2), a first computer 22 connected to the first input/output channel 18, a second computer 23 connected to the second input/output channel 19, and an external storage device 43 which is connected to the first computer 22 and enables reading/writing, for example, of a floppy disc, a CD-R or a CD-ROM. The second input/output channel 19 connected to the second head 13 is not allowed to perform writing. Thus, although the first head 12 can both read and write, the second head 13 can only read. Furthermore, each one of the first head 12 and the second head 13 independently carries out reading and writing irrespective of the position and operation mode of the other head.

Description will now be made of the fact that, even when necessary files are read from the external storage device such as a CD-ROM in which a virus program lies concealed, this computer system constructed as described above will not be destroyed by the virus program. First, it is assumed that the necessary files are read from the CD-ROM containing the concealed virus program by means of the external storage device 43 for the first computer 22, and then copied to the hard disc 11. An infection of a computer system with a virus means the fact that a file existing therein is altered (that is to say, the file is rewritten). In this embodiment, the second computer 23 can only read the disc 11 for execution (i.e., cannot write thereinto). Therefore, even when the second computer 23 executes the file containing the above virus, the disc 11 will not be rewritten, and thus the computer system will not be destroyed. When the second computer 23 executes a file which may have been infected with a virus, an effect will appear on the operation thereof if the file has indeed been infected. In such a case, virus checking should be done. When a virus is found in this checking, the first computer 22 removes the relevant files which have been written in the disc 11 and the external storage device 43. If no virus has been found, the first computer 22 executes the relevant files. In that case, since the first computer 22 can perform reading/writing with respect to the disc 11, a full execution of the program is possible. Thus, this information processing system is prevented from the destruction by the virus.

Figure 4:
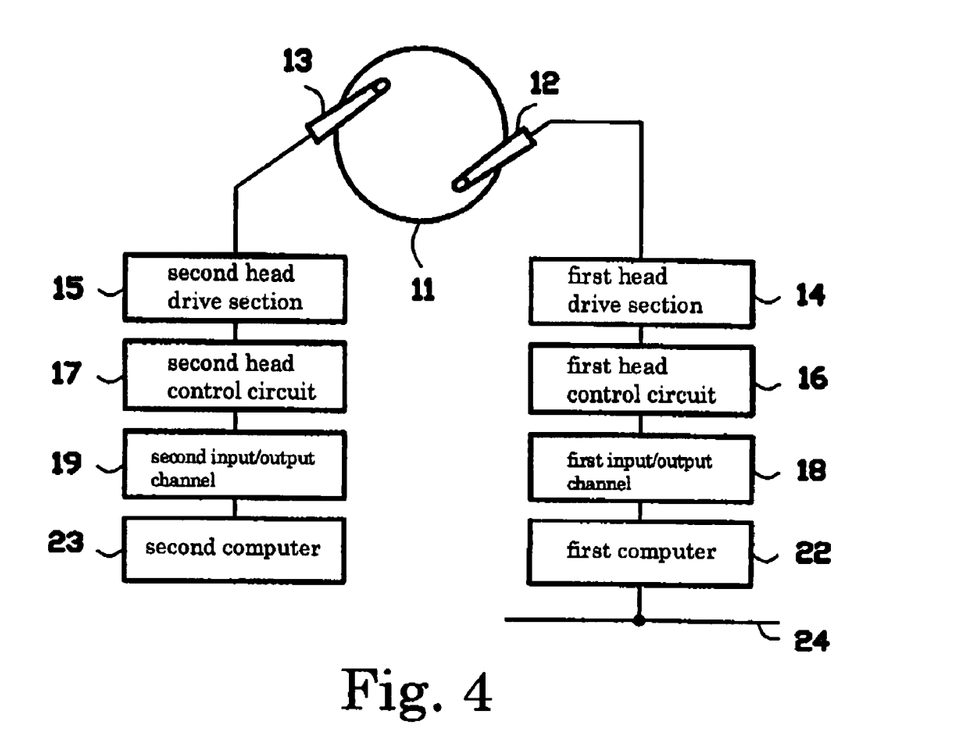
FIG. 4 shows the structure of an information processing system according to an embodiment of the invention.

FIG. 4 shows the structure of another information processing system provided in accordance with the present invention. This information processing system comprises a writable disc 11 such as a hard disc, a hard-disc drive section for driving the writable disc 11, a first head 12 for reading data from and writing data into the writable disc 11 and having a security function, a first head drive section 14 for mechanically moving the first head 12, a first head control circuit 16 for carrying out a control such that the first head 12 performs reading/writing, a first input/output channel 18 connected to the first head control circuit, a second head 13 for reading data from and writing data into the writable disc 11, a second head drive section 15 for mechanically moving the second head 13, a second head control circuit 17 for carrying out a control such that the second head 13 performs reading/writing, a second input/output channel 19 connected to the second head control circuit 17, a first computer 22 connected to the first input/output channel 18 and a second computer 23 connected to the second input/output channel 19. In this case, the first head 12 and the second head 13 are driven independently of each other, while the first computer 22 is connected to a network 24 such as a public line and an in-house LAN.

The operation of this information processing system will now be described. In the first place, description will be made of the case where the system is used for the maintenance and/or management of a home page. In this case, the system administrator of the home page carries out reading/writing of information for the home page with respect to the disc through the second head 13 using the second computer 23.

On the other hand, a third person who wished to read this home page reads information relating to the home page in the disc 11 by means of the first head 12 through the first computer 22.

Let us consider a case where a malicious third person tries to alter the home page stored in the writable disc 11. In this case, the computer connected to the external network 24 is the first computer 22 and the head connected to this computer is the first head 12. Therefore, even if the malicious third person succeeds in fully controlling the first computer 22 she/he cannot reach the second head 13 connected to the second computer, so that the malicious third person cannot destroy nor alter the home page and/or the mails in a way in which the second computer 23 is used.

When the first head 12 is for exclusive use for reading, a user entering this information system from the external network cannot write into the disc 11 by means of the first head 12, so that the security of this information system is more robust than the information system just described above.

Description will now be made of the operation of the information processing system in which the first head 12 is a write-only head exclusively for performing writing into empty areas of the disc. This information system is suitable for the maintenance and management of e-mails. First, a case where an external user writes an e-mail through the network 24 will be described. The e-mail of this user is written into the writable disc 11 by means of the first computer 22 connected to the network 24 and the first head 12. Subsequently, the system administrator reads that e-mail thus written in the disc by means of the second computer 23 using the second head 13, checks it for virus or the like and then stores it in an e-mail mailbox provided on a local disc or the like which is separate from the above disc 11. Then, the system administrator erases the mail, which has thus been stored, from the disc 11 by means of the second computer 23 using the second head 13. The recipient of this e-mail who uses the second computer 23 can open the e-mail mailbox on the local disc of the second computer 23 and read the mail addressed to her/him.

When a malicious third person attempts to surreptitiously read a mail which has been written from the external network 12, she/he will not succeed since such a mail which has been written by an authorized user is stored in the local disc connected to the second computer 23. Even if the malicious third person tries to read the mail before it is moved to the local disc, she/he cannot read the contents of the mail since the first head 12 is for exclusive use for writing in an empty area and is thus not able to perform reading. Thus, the malicious third person cannot read nor destroy the existing mails by the first head 12, so that the security of this system is quite robust.

Figure 5:
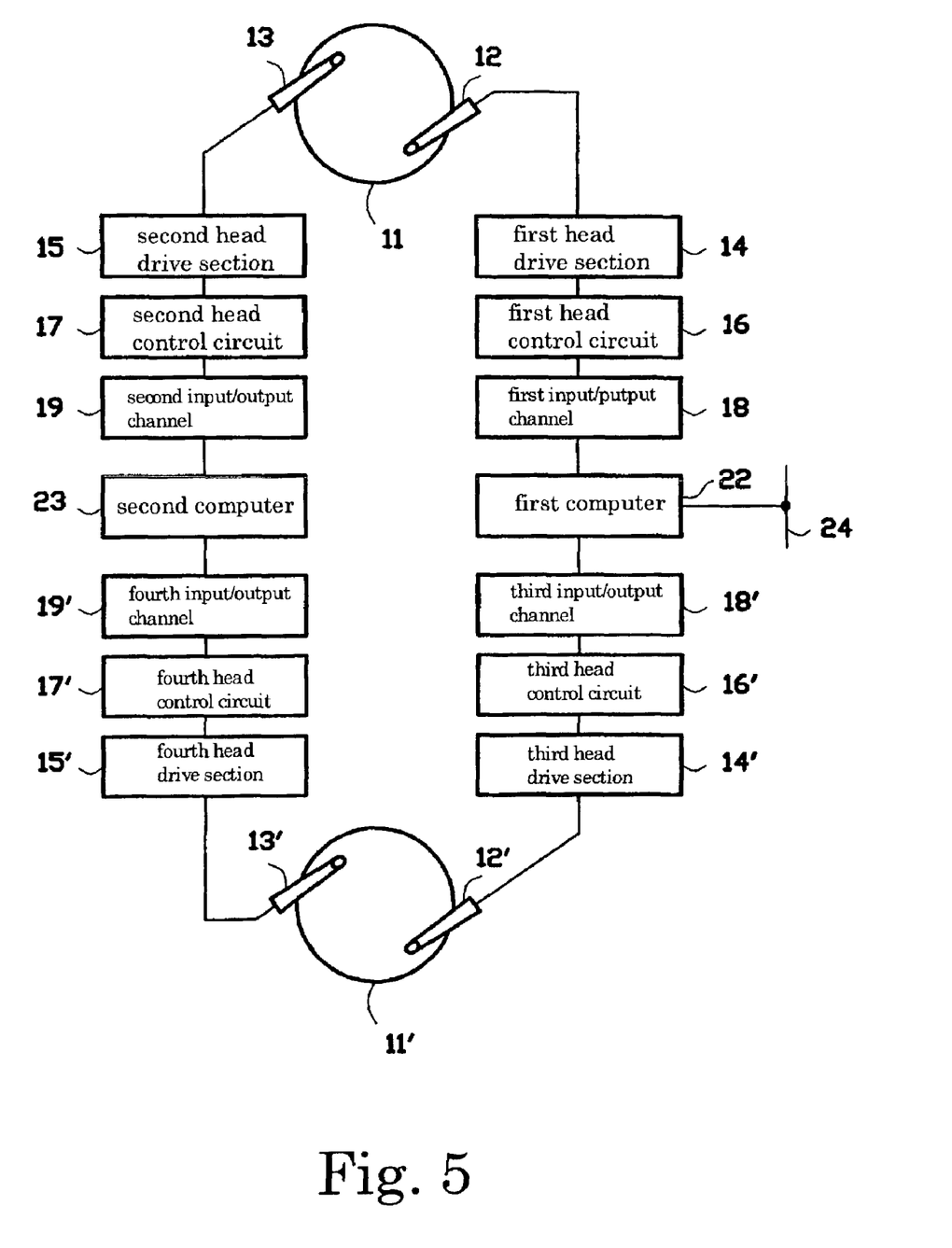
FIG. 5 shows the structure of an information processing system according to another embodiment of the invention.

An information processing system provided with two writable discs in accordance with a second embodiment of the invention will now be described with reference to FIG. 5. This information processing system is formed by adding, to the structure of the first embodiment between the first computer 22 and the second computer 23, a second disc 11', a hard-disc drive section for driving the second disc 11', a third head 12' for carrying out reading/writing with respect to the second disc 11', a third head drive section 14' for driving the third head 12', a third head control circuit 16' for carrying out a control such that the third head 12' performs reading/writing, a third input/output channel 18', a fourth head 13' for performing reading/writing with respect to the second disc 11', a fourth head drive section 15' for mechanically moving the fourth head 13', a fourth head control circuit 17' for carrying out a control such that the fourth head 13' performs reading/writing and a fourth input/output channel 19' connected to the fourth head control circuit 17'.

In the above structure, the first head 12 is exclusively for reading while the third head 12' is a write-only head for performing writing only into empty areas on the disc 11'. The second head 13 and the fourth head 13' are for reading/writing as in the first embodiment. The first head 12 and the third head 12' are connected to the external network 24 through the first computer 22. The second head 13 for reading/writing and the fourth head 13' for reading/writing are connected to the second computer 23.

The principle of operation of this information system will now be described. The information for the home page of the system administrator is maintained and managed by the second computer 23, and the information necessary therefore is written in the disc 11 by means of the second head 13. When a user attempts to read the home page stored in this system, the first computer 22 reads the home page with the first head 12 and provides it to the user through the external network 24. On the other hand, mails of external users are maintained and managed by the second computer 23 in a manner similar to that described above for the first embodiment. When a user writes a mail in this system through the external network 24, the first computer 22 writes the mail of that user into the disc 11' with the third head 12'. The mail thus written is moved to a local disc of the second computer 23.

With this system, even when a malicious third person intrudes into this system via the external network 24 and fully controls the first computer 22, this malicious third person cannot perform alteration and/or surreptitious reading of the mails which have already arrived, alteration of the access logs, alteration of the home page or the like. This is because only connected to the external network 24 are the first head 12 which can only read the disc 11 and the third head 12' which can only perform writing into empty areas of the disc 11'.

The second computer 23 writes into the disc 11 information, for example, for the home page which is to be presented to the outside, and also reads out of the disc 11' information, for example, of those mails which the first computer 22 received from the outside and then moves the information thus read to the mailbox present on the separate local disc for example. Although the information read from the disc 11' should carefully be checked for possible destroying functions contained therein, such treatment may be limited to those destructions which will be brought about through mails.

Figure 6:
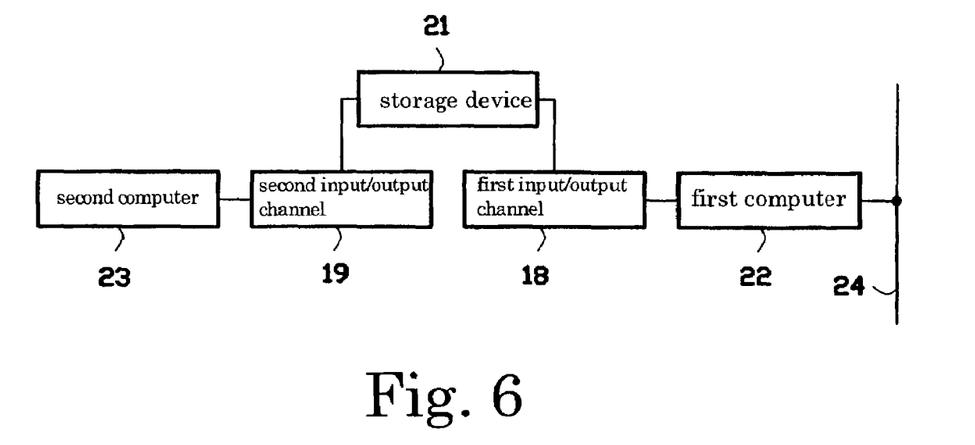
FIG. 6 shows the structure of an information processing system according to an embodiment of the invention, which comprises a storage device.

FIG. 6 shows the structure of an information processing system provided in accordance with another embodiment of the present invention. This information processing system comprises a writable storage device 21, first and second input/output channels 18 and 19 coupled to the storage device 21, a first computer 22 connected to the first input/ output channel 18 and a second computer 23 connected to the second input/output channel 19. The first computer 22 is connected to an external network 24 such as the Internet and an intranet. The first input/output channel 18 is arranged as a channel exclusively for performing reading from the storage device 21 or a channel exclusively for performing writing into an empty area of the storage device 21 in dependence on the application of this information processing system. The first input/output channel 18 and the second input/output channel 19 are driven independently of each other.

The operational of this information processing system will now be described for the case where the first input/output channel 18 is a read-only channel for the storage device 21. This information processing system will be suitable for the maintenance and/or management of a home page. The system administrator of the home page carries out reading/writing of information for the home page with respect to the storage device 21 through the second input/output channel 19 using the second computer 23. On the other hand, a third person who wished to view this home page reads the home page in the storage device 21 by means of the first input/output channel 18 through the first computer 22 connected to the external network 24.

Let us consider a case where a malicious third person tries to alter the home page stored in the storage device 21. The external network 24 is connected to the first computer 22 but not connected to the second computer 23. Therefore, even if the malicious third person succeeds in fully controlling the first computer 22 she/he cannot reach the second input/output channel 19 connected to the second computer 23, so that the malicious person cannot destroy nor alter the home page stored in the storage device 21 by means of the second computer unless she/he can control this second computer 23.

Also, since the first input/output channel 18 is a read-only channel, a user entering this information system from the external network 24 cannot perform writing into the storage device 21 even by means of the first computer. Thus, the security of this information system is quite robust.

Description will now be made of the operational of the information processing system in which the first input/output channel 18 is a write-only channel exclusively for performing writing into empty areas of the storage device 21. This information processing system is suitable for the maintenance and management of e-mails. When an external user writes an e-mail through the external network 24, the e-mail of this user is written into the storage device 21 by means of the first computer 22 connected to the external network 24 and the first input/output channel 18. Subsequently, the system administrator reads that e-mail thus written in the storage device 21 by means of the second computer 23 through the second input/output channel 19, checks it for virus or the like and then stores it in an e-mail mailbox provided on a local disc or the like which is separate from the above storage device 21. After the e-mail has thus been stored in the mailbox, the mail stored in the storage device 21 is erased by means of the second computer 23 and the second input/output channel 19. A user who uses the second computer 23 can open the e-mail mailbox in the local disc of the second computer 23 and read the mail addressed to her/him.

In this manner, mails written by authorized users are stored in the local disc connected to the second computer 23. Since it is impossible for a malicious third person to reach the second input/output channel 19 from the external network 24, she/he cannot stealthily read the mails stored in the local disc. Even if the malicious third person tries to stealthily read or alter the mail written in the storage device 21 before it is moved to the local disc, she/he cannot read nor overwrite the contents of the mail since the first input/output channel 18 is a write-only channel for writing into an empty area where no mail has been written. Thus, malicious third persons cannot read nor destroy the existing mails, so that the security of this system is robust.

Figure 7:
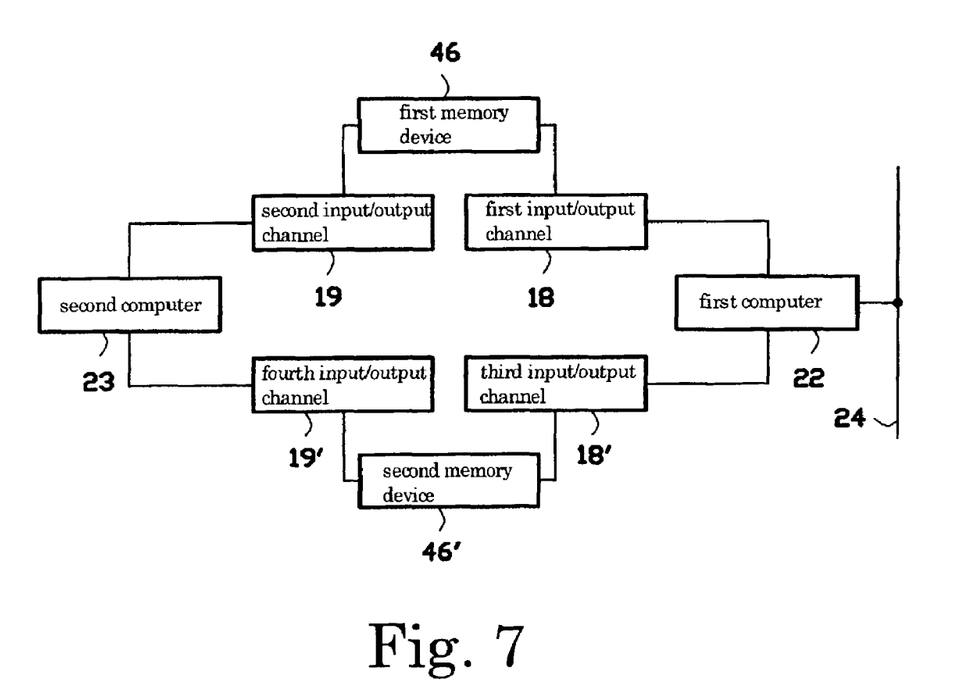
FIG. 7 shows the structure of an information processing system according to an embodiment of the invention, which comprises two storage devices.

An information processing system which is provided with two writable storage devices will now be described with reference to FIG. 7. This information processing system is provided, in addition to the structure of the information processing system of FIG. 6 and between the first computer 22 and the second computer 23, with a second storage device 46', a third input/output channel 18' coupled to the second storage device 46' and a fourth input/output channel 19' coupled to the second storage device 46'. The first input/output channel 18 is exclusively for reading from a first storage device 46, while the third input/output channel 18' is a write-only channel for performing writing only into empty areas of the second storage device 46'. The second input/output channel 19 and the fourth input/output channel 19' are channels for reading/writing as in the information processing system of FIG. 6. The first input/output channel 18 and the third input/output channel 18' are connected to the external network 24 through the first computer 22. The second input/output channel 19 for reading/writing and the fourth input/output channel 19' for reading/writing are connected to the second computer 23.

The operational of this information processing system will now be described. The information for the home page of the system administrator is written into the first storage device 46 and maintained and managed by the second computer 23 through the second input/output channel 19. When an external user wishes to read the home page stored in this first storage device 46, the first computer 22 reads the home page with the first input/output channel 18 and provides it to the user through the external network 24. On the other hand, mails of external users are stored, maintained and managed in the mailbox on a local disc by the second computer 23 in a manner similar to that described above for the information processing system of FIG. 6. When a user sends a mail to this system through the external network 24, the first computer 22 writes the mail of that user into the second storage device 46' through the third input/output channel 18'. The mail thus written is moved to the mailbox on the local disc of the second computer 23.

Only connected to the first computer 22 which is connected to the external network 24 are the first input/output channel 18 which can only read the contents of the first storage device 46 and the third input/output channel 18' which can only perform writing into those empty areas of the second storage device 46' in which no mail nor access log have been written. In other words, the first computer 22 connected to the external network 24 is not connected to the second computer 23 which maintains and manages the home page and mails. Therefore, even when a malicious third person intrudes into this system via the external network 24 and fully controls the first computer 22, she/he cannot reach the second computer 23, so that this malicious third person cannot perform alteration and/or surreptitious reading of the mails which have already arrived, alteration of the access logs, alteration of the home page or the like by means of the second computer.

Since the first input/output channel 18 is a read-only channel for the first storage device 46, a malicious intruder cannot perform writing into the first storage device 46 even by means of the first computer.

Furthermore, since the third input/output channel 18' is a write-only channel for writing only into an empty area of the second storage device 46', a malicious intruder cannot read from the second storage device 46' nor overwrite the existing records in this device. Consequently, the security of this system is quite robust.

The second computer 23 writes into the first storage device 46 information, for example, for the home page which is to be presented to the outside. Further, the second computer 23 reads out of the second storage device 46' information, for example, of those mails which the first computer 22 has received and written into the second storage device 46', and moves the information thus read to the mailbox present on the separate local disc for example. Although the information, such as mails, read from the second storage device 46' should carefully be checked for possible system-destroying programs contained therein, such checking needs to be performed only for those programs transmitted via mails.

When the storage devices 46 and 46' are constituted each by an electronic circuit such as a semiconductor integrated circuit, it becomes possible to realize an information processing system which is compact and reliable by virtue of the absence of movable parts such as a writable disc.

Figure 8:
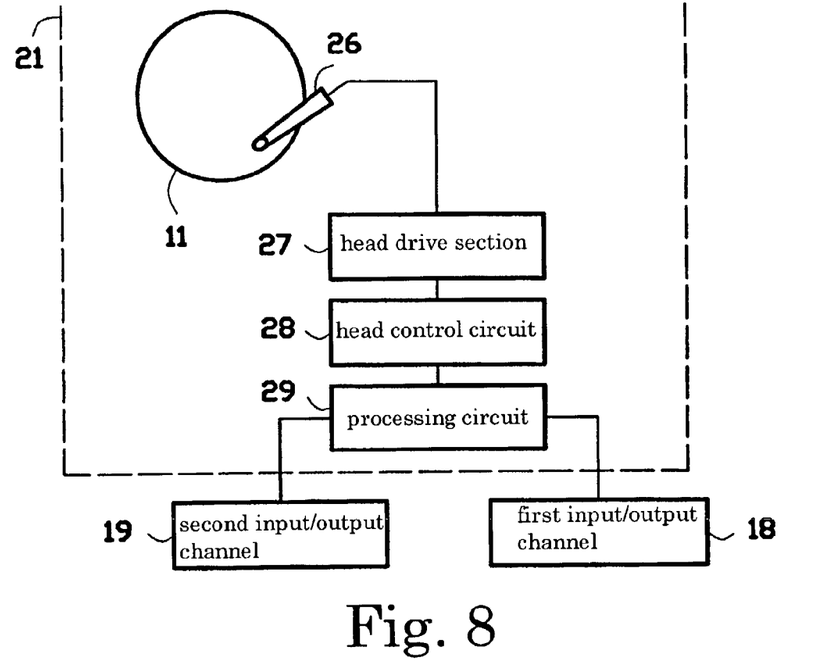
FIG. 8 shows the structure of a storage device having a writable disc with a single head.

A storage device for the information processing system which comprises a writable disc will be described with reference to FIG. 8. The writable storage device 21 comprises a writable disc 11, a head 26 for reading data from and writing data into the writable disc 11, a head drive section 27 for driving the head, a head control circuit 28 for controlling the head, and a processing circuit 29. This processing circuit 29 is connected to the first input/output channel 18 and the second input/output channel 19 and processes read/write requests from the first input/output channel 18 and the second input/output channel 19. This processing circuit supplies the results of the processing to the head control circuit 28 and receives information therefrom.

Figure 9:
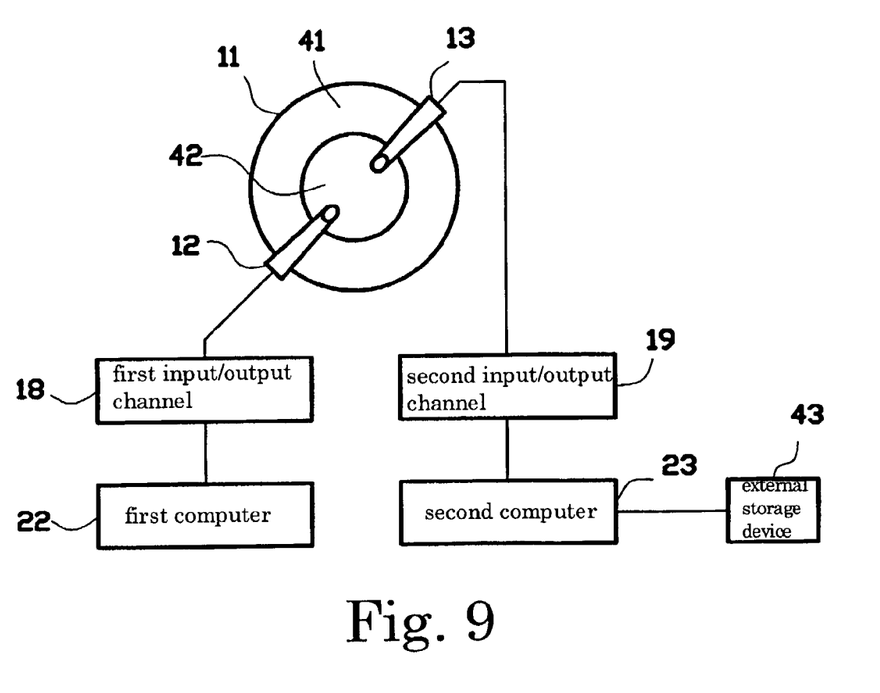
FIG. 9 shows an information processing system according to an embodiment of the invention which is prevented from destruction by a virus program.

An information processing system in which the writable disc has a plurality of record areas will now be described with reference to FIG. 9. This information processing system comprises a hard disc 11, heads 12 and 13 for performing reading/writing with respect to the disc 11, two or more input/output channels 18 and 19 connected to the heads, a first computer 22 connected to one of the input/output channels (the first input/output channel 18) and a second computer 23 connected to another one of the input/output channels (the second input/output channel 19). The hard disc 11 is provided with a plurality of record areas 41 and 42 to which respective operation modes can be set independently of each other. The second computer 23 is connected to an external storage device 43 which enables reading/writing of a disc such as a CD-R and a CD-ROM.

In this embodiment, an arrangement is made such that the following relationship is established between the first record area 41 and the second record area 42, on the one hand, and the first computer 22 and the second computer 23, on the other hand. First, the first computer 22 is arranged so as to be able to perform reading and writing of data with respect to any of the first record area 41 and the second record area 42 by means of head 12 connected to the first input/output channel 18. On the other hand, the second computer 23 is arranged so as to be able to perform reading of data but unable to perform writing of data with respect to the first record area 41 by means of the head 13 connected to the second input/output channel 19. The second computer 23 is further arranged so as to be unable to perform reading of data and only able to perform writing of data in an adding fashion with respect to the second record area 42.

Description will now be made of the fact that, even when necessary files are read from a CD-ROM in which a virus program may lie in a concealed manner, this information processing system constructed as described above will not be destroyed by the virus program. First, it is assumed that the necessary files are read from the CD-ROM containing the concealed virus program by means of the external storage device 43 of the second computer 23, and then recorded on the disc in the second record area 42. As a matter of course, the virus program is recorded in the second record area 42. Subsequently, the first computer 22 copies the files recorded in the second record area 42 and containing the virus program to the first record area 41.

An infection of an information processing system with a virus means the fact that a file existing therein is altered (that is to say, the file is rewritten). Therefore, if the record area in which a file has been recorded is not rewritable, then the file will never be altered. In this embodiment, the second computer 23 can only read the first record area 41 (i.e., cannot write thereinto). Therefore, even when the second computer 23 executes the file containing the above virus, the first record area 41 will not be rewritten, and thus this information processing system will not be destroyed. On the other hand, the second computer 23 cannot read the second record area 42, and therefore it will never happen that the second computer 23 reads the files written in the second record area 42. Consequently, even when the program containing the virus is executed, the second computer 23 can rewrite neither the files in the first record area 41 nor the files in the second record area 42.

Thus, the second computer 23 can execute the file containing the virus without damaging the files written in any of the first and second record areas 41 and 42 and examine its behavior. Based on the results, the first computer 22 makes a check to determine whether there is a virus in the written file. If a virus is found, the relevant files written in the first record area 41 and the second record area 42 are removed. If no virus is found, the first computer 22 executes the relevant files. In that case, since the first computer 22 can perform reading/writing with respect to any of the record areas 41 and 42, a full execution of the program is possible. Thus, this information processing system is prevented from the destruction by the virus.

Figure 10:
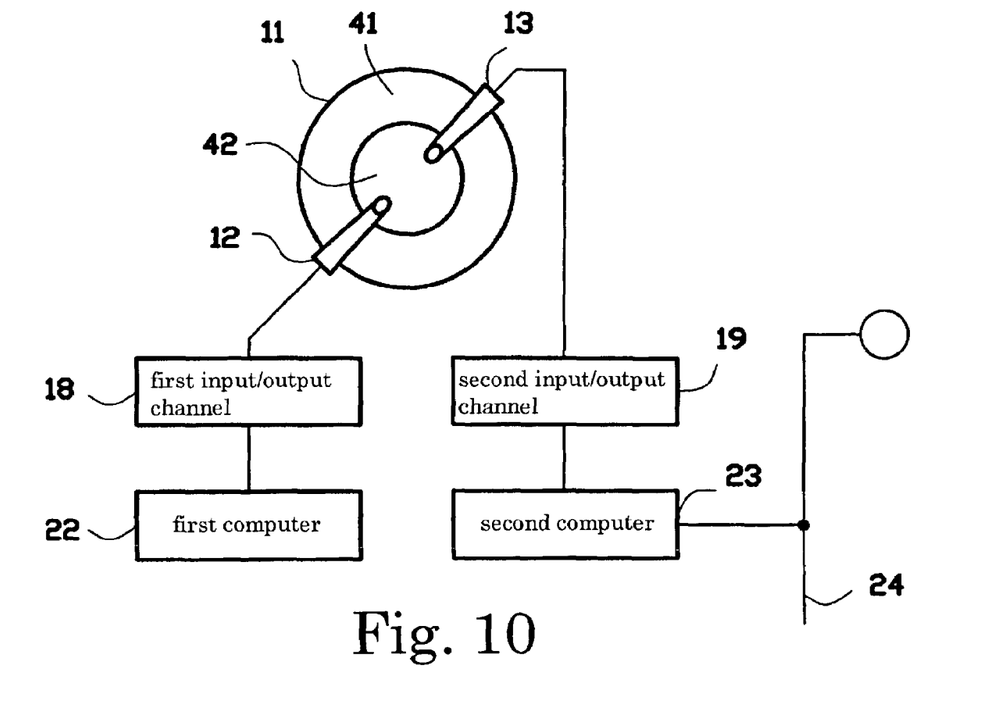
FIG. 10 shows an information processing system according to an embodiment of the invention which is prevented from alteration of files by a hacker.

An information processing system suitable for use as a server for a home page and mails will be described with reference to FIG. 10. This computer system is different from the above-described embodiment in that the second computer 23 is connected a network 24 such as the Internet. The second computer 23 may further be connected to an external storage device which enables reading/writing of a disc such as a CD-R and CD-ROM. An arrangement is also made to establish the same relationship as that in the above-mentioned embodiment between the first record area 41 and the second record area 42, on the one hand, and the first computer 22 and the second computer 23, on the other hand.

The first record area 41 is suitable for storing data for open information such as a home page. It is here assumed that a hacker on the network 24 has gained the root privilege of the second computer 23 in an effort to alter the data of the home page or the like recorded on the hard disc 11. However, the second computer 23 can only read the first record area 41 and cannot read the second record area 42. In addition, the second computer 23 cannot write into the first record area 41, and therefore it is impossible for the hacker to alter or delete the programs and/or data of the home page which have been written in the hard disc 11. Rewriting of the programs and/or data in the first record area 41 is performed by means of the head 12 connected to the first computer 22.

The second record area 42 is suitable for relaying mails of the users on the network 24. A mail written into the second record area 42 by a user on the network 24 is copied by the first computer 22 to the first record area 41. Since the second computer 23 can read files in the first record area 41, a user on the network 24 can read mails recorded in the first record area 41 and addressed to her/him.

The first computer 22 can not only read data from but also write data into the second record area 42, whereas the second computer 23 cannot read data from the second record area 42 and can only add data thereto. Therefore, the second record area 42 is also suitable for storing closed information such as cipher keys, passwords and addresses. Third persons on the network 24 such as the Internet cannot read data from the second record area 42 through the second computer 23, so that such information will not leak out. When the system administrator wishes to change the information, such change will be made by means of the head 12 connected to the first computer 22.

It is here assumed that a mail or home-page information with a virus has been written into the second record area 42 through the network 24. It may then be possible that the contents of the memory of the second computer 23 are destroyed directly by the virus. When it is detected, based on an abnormal operation of the second computer 23, that the memory contents have been destroyed, the first computer 22 deletes that mail containing the virus from the second record area 42 and has the second computer 23 restarted. By this operation, this information processing system will be prevented from being destroyed by the mail containing the virus and sent through the network 24.

In accordance with the embodiments described above with reference to FIGS. 9 and 10, the information processing system comprises the hard disc provided with two heads 12 and 13. However, the number of heads should not necessarily be two, but only one head may suffice. In the following, description will be made on an information processing system of such structure with reference to FIG. 11.

Figure 11:
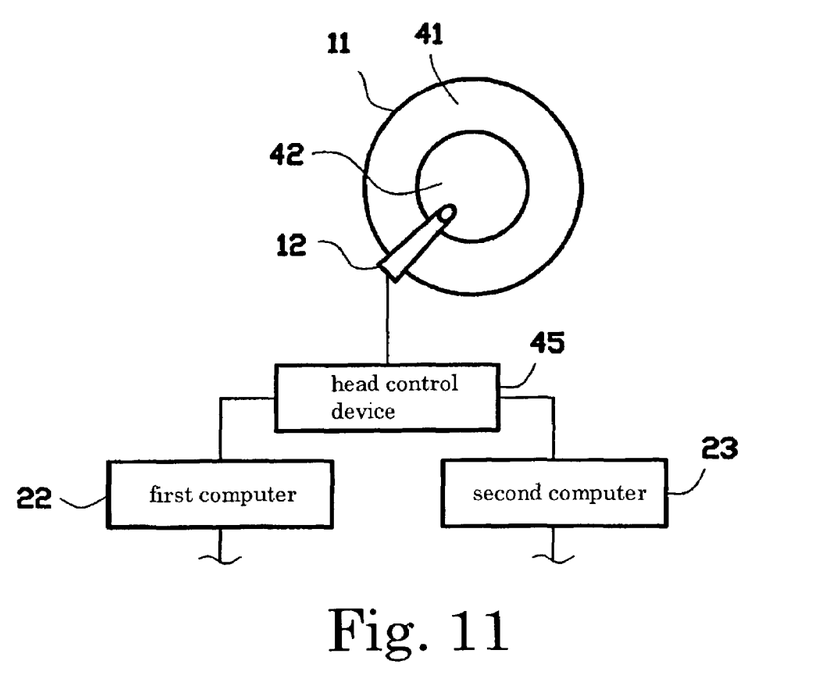
FIG. 11 shows a main part of the structure of an information processing system according to an embodiment of the invention which comprises a writable disc with a single head.

In the information processing system comprising a hard disc with a single head, a head control device 45 is additionally provided. The structure of this information processing system in other respects is the same as those of the embodiments described with reference to FIGS. 9 and 10. The head control device 45 carries out such a control that the single head 12 has functions of two independent heads in a time sharing manner. For example, the head 12 is caused to function as a first head in a first time period and then function as a second head in a second time period following the first time period, thereafter such operation being repeated. According to this structure, functions of a plurality of heads can be realized with a single head.

In any of the above-described information processing systems, a hard disc, a DVD-RAM, a magneto-optical disc or the like can be used as the writable disc 11. These discs are the most popular and widely used storage media at present, so that the information processing system utilizing such writable disc is relatively cheap and reliable.

The external network 24 may not only be the Internet but also be a LAN or an intranet. In the case of an intranet, such information which may be open to the employees but is prohibited from alteration can be treated in a safe manner.

In the present invention, the external network 24 may include any transmission medium such as an analog telephone line, an ISDN telephone line, a DSL, a CATV line, an optical fiber, Ethernet, 10BASE-T, 100BASE-T, an infrared signal and a radio wave signal.

What is claimed is:

1. An information processing system comprising:
   a writable disc (11);
   a disc drive section for driving said disc;
   a first head (12) arranged so as to be able to perform reading only for reading data from said disc;
   a first head drive section (14) for driving said first head;
   a first head control circuit (16) for controlling said first head;
   a first input/output channel (18) connected to said first head control circuit;
   a second head (13) for reading data from and writing data into said disc;
   a second head drive section (15) for driving said second head;
   a second head control circuit (17) for controlling said second head;
   a second input/output channel (19) connected to said second head control circuit;
   a first computer (22) connected to said first input/output channel (18) and provided with an external storage device; and
   a second computer (23) connected to said second input/output channel (19);
   wherein said first head and said second head are driven independently of each other.

2. An information processing system comprising;
a writable disc (11);
a disc drive section for driving said disc;
a first head (12) for reading data from into said disc;
a first head drive section (14) for driving said first head;
a first head control circuit (16) for controlling said first head;
a first input/output channel (18) connected to said first head control circuit;
a second head (13) for reading data from and writing data into said disc;
a second head drive section (15) for driving said second head;
a second head control circuit (17) for controlling said second head;
a second input/output channel (19) connected to said second head control circuit;
a first computer (22) connected to said first input/output channel; and
a second computer (23) connected to said second input/output channel;
wherein said first head and said second head are driven independently of each other;
wherein said first computer is connected to an external network (24); and
wherein said first head (12) is arranged as a read-only head.

3. An information processing system according to claim 2 further comprising, connected between said first computer (22) and said second computer (23), a writable second disc (11'), a second disc drive section for driving said second disc, a third head (12') exclusively for carrying out writing into an empty area of said second disc, a third head drive section (14') for driving said third head, a third head control circuit (16') for controlling said third head, a third input/output channel (18') connected to said third head control circuit, a fourth head (13') for reading data from and writing data into said second disc, a fourth head drive section (15') for driving said fourth head, a fourth head control circuit (17') for controlling said fourth head and a fourth input/output channel (19') connected to said fourth head control circuit.

4. An information processing system comprising;
a writable disc (11);
a disc drive section for driving said disc;
a first head (12) for reading data from into said disc;
a first head drive section (14) for driving said first head;
a first head control circuit (16) for controlling said first head;
a first input/output channel (18) connected to said first head control circuit;
a second head (13) for writing data into said disc;
a second head drive section (15) for driving said second head;
a second head control circuit (17) for controlling said second head;
a second input/output channel (19) connected to said second head control circuit;
a first computer (22) connected to said first input/output channel; and
a second computer (23) connected to said second input/output channel;
wherein said first head and said second head are driven independently of each other;
wherein said first computer is connected to an external network (24); and
wherein said second head (12) is arranged as a write-only head exclusively for writing into an empty area of said disc.

5. An information processing system comprising:
a writable storage device (21, 46);
a first input/output channel (18) coupled to said storage device (21) exclusively for performing reading from said storage device (21);
a second input/output channel (19) coupled to said storage device (21) for performing reading/writing with respect to said storage device (21);
a first computer (22) connected to said first input/output channel (18); and
a second computer (23) connected to said second input/output channel (19);
wherein said first input/output channel (18) and said second input/output channel (19) are driven independently of each other; and
wherein said first computer (22) is connected to an external network (24).

6. An information processing system according to claim 5, wherein said writable storage device (21) comprises:
a writable disc (11);
a head (26) for reading data from and writing data into said writable disc (11);
a head drive section (27) for driving said head;
a head control circuit (28) for controlling said head; and
a processing circuit (29) connected to said first input/output channel (18) and said second input/output channel (19) for processing read/write requests from said first input/output channel (18) and said second input/output channel (19), said processing circuit supplying results of the processing to and receiving information from said head control circuit (28).

7. An information processing system according to claim 5 further comprising, connected between said first computer (22) and said second computer (23), a writable second storage device (46'), a write-only third input/output channel (18') coupled to said second storage device (46') for carrying out writing only into an empty area of said second storage device (46'), and a fourth input/output channel (19') coupled to said second storage device (46') for performing reading/writing with respect to said second storage device (46').

8. An information processing system according to claim 5, wherein said disc is a hard disc.

9. An information processing system according to claim 5, wherein said writable storage device (21) is constituted by an electronic circuit.

10. An information processing system comprising:
a writable storage device (21);
a first input/output channel (18) coupled to said storage device (21) exclusively for performing writing into an empty area of said storage device (21);
a second input/output channel (19) coupled to said storage device (21) for performing reading/writing with respect to said storage device (21);
a first computer (22) connected to said first input/output channel (18); and
a second computer (23) connected to said second input/output channel (19);
wherein said first input/output channel (18) and said second input/output channel (19) are driven independently of each other; and
wherein said first computer (22) is connected to an external network (24).

11. An information processing system according to claim 10, wherein said writable storage device (21) comprises:

a writable disc (11);

a head (26) for reading data from and writing data into said writable disc (11);

a head drive section (27) for driving said head;

a head control circuit (28.) for controlling said head; and a processing circuit (29) connected to said first input/output channel (18) and said second input/output channel (19) for processing read/write requests from said first input/output channel (18) and said second input/output channel (19), said processing circuit supplying results of the processing to and receiving information from said head control circuit (28).

12. An information processing system according to claim 10, wherein said writable storage device (21) is constituted by an electronic circuit.

13. An information processing system according to claim 10, wherein said disc is a hard disc.

14. An information processing system comprising a writable disc (11) having a plurality of record areas (41, 42), at least one head (12, 13) for performing reading/writing with respect to said disc, at least two input/output channels (18, 19) connected to said head, a first computer (22) connected to a first input/output channel (18), and a second computer (23) connected to a second input/output channel (19) and provided with an external storage device (43), wherein said first record area (41)of said record areas is arranged as an area which can only be read through said second input/output channel (19), while said second record area (42) other than said first record area is arranged as an area to which only an additional writing can be made through said second input/output channel (19), said first and second areas both being arranged such that reading and writing can be made with respect thereto through said first input/output channel (18), said first computer (22) reading a file, which has been written by said second computer into said second area, and writing same into said first area, said second computer (23) reading a file from said external storage device (43) and adding same to said second area.

15. An information processing system according. to claim 14, wherein said disc is a hard disc.

16. An information processing system according to claim 14, wherein said head is unity, and wherein a head control device (45) is further provided.

17. An information processing system according to claim 14, wherein said information processing system is used as a home-page server.

18. An information processing system according to claim 14, wherein said information processing system is used as an e-mail server.

19. An information processing system comprising a disc (11) having a plurality of record areas (41, 42), at least one head (12, 13) for performing reading/writing with respect to said disc, at least two input/output channels (18, 19) connected to said head, a first computer (22) connected to a first input/out channel (18) and a second computer (23) connected to a second input/output channel (19) and connected to a network (24), wherein said first record area (41) of said record areas is arranged as an area which can only be read through said second input/output channel (19), while said second record area (42) other than said first record area is arranged as an area to which only an additional writing can be made through said second input/output channel (19), said first and second record areas both being arranged such that reading and writing can be made with respect thereto through said first input/output channel (18), said first computer (22) reading a file, which has been written by said second computer (23) into said second record area, and writing same into said first record area (41), said second computer (23) receiving a file from said network (24) and adding same to said second record area (42).

20. An information processing system according to claim 19, wherein said disc is a hard disc.

21. An information processing system according to claim 19, wherein said head is unity, and wherein a head control device (45) is further provided.

22. An information processing system according to claim 19, wherein said information processing system is used as a home-page server.

23. An information processing system according to claim 19, wherein said information processing system is used as an e-mail server.

* * * * *